No. 732,243. PATENTED JUNE 30, 1903.
H. H. WARD.
TIME CONTROLLED GAS COCK.
APPLICATION FILED DEC. 1, 1902.
NO MODEL. 3 SHEETS—SHEET 2.

WITNESSES. INVENTOR.

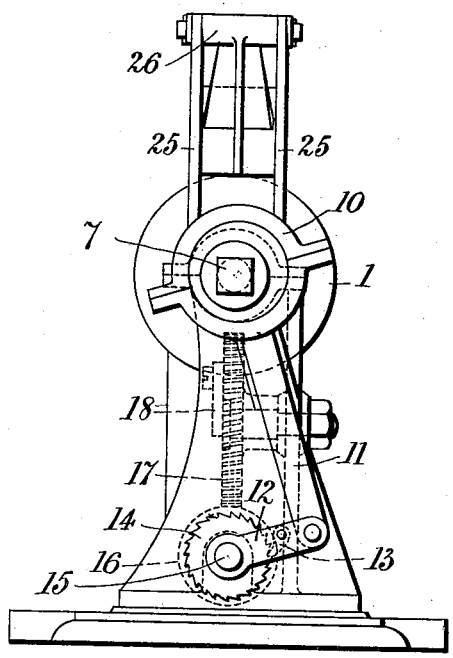
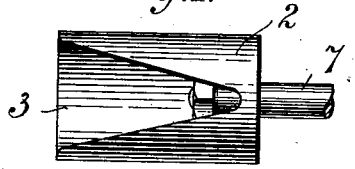
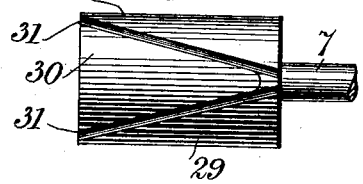

No. 732,243. Patented June 30, 1903.

UNITED STATES PATENT OFFICE.

HAROLD HUNTER WARD, OF BOREHAM WOOD, ENGLAND.

TIME-CONTROLLED GAS-COCK.

SPECIFICATION forming part of Letters Patent No. 732,243, dated June 30, 1903.

Application filed December 1, 1902. Serial No. 133,497. (No model.)

*To all whom it may concern:*

Be it known that I, HAROLD HUNTER WARD, a subject of His Majesty the King of Great Britain, residing at Boreham Wood, in the county of Herts, England, have invented a certain new and useful Improved Apparatus for Timing and Controlling the Flow of Fluids, of which the following is a specification.

My invention may be employed for various purposes where fluid must be supplied only for a certain period each day, said periods varying in length from day to day. Thus the invention may be employed for the automatic lighting of clock-faces or signs during the dark hours of the evening or night, the apparatus being adapted to control the supply of the artificial illuminating agent by turning it on or off in the case of gas or otherwise with other agents, such as electricity, at the commencement and termination of the dark hours, respectively, so that church and public clocks or signs may be conveniently and economically illuminated.

The apparatus is adapted also for other purposes requiring an automatic action annually for timing work.

In the accompanying drawings the apparatus is shown in one of the forms as adapted to control the passage of gas, water, or other fluid, and in this—

Figure 1:
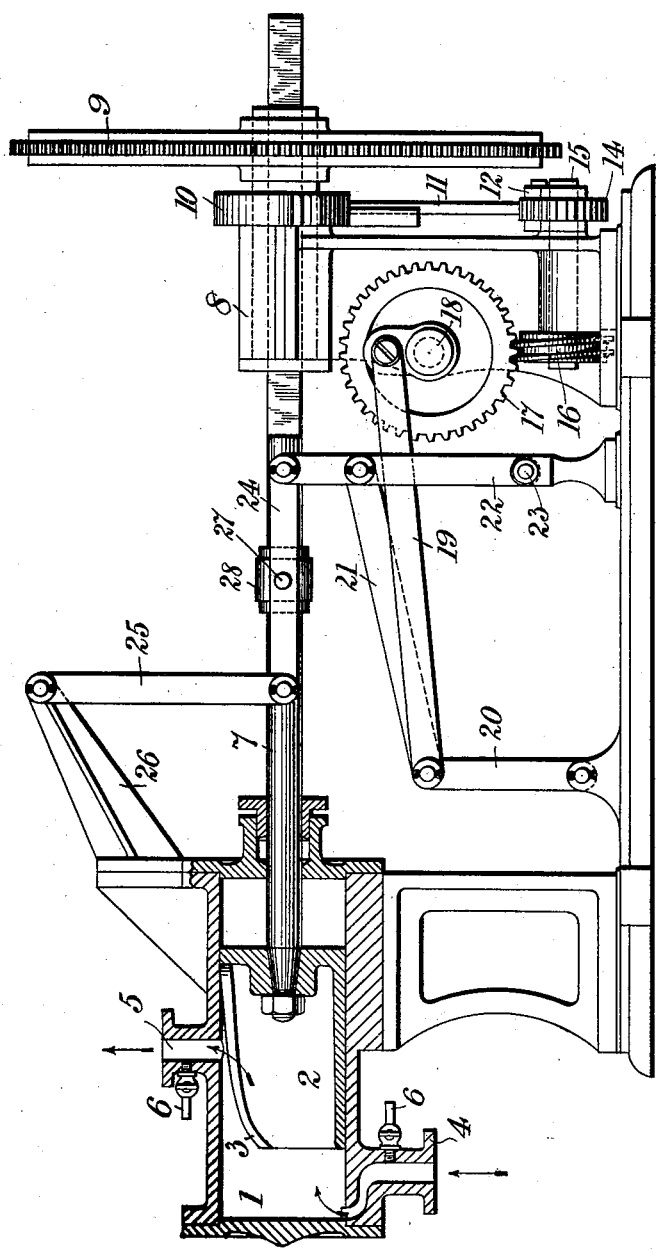
Figure 2:
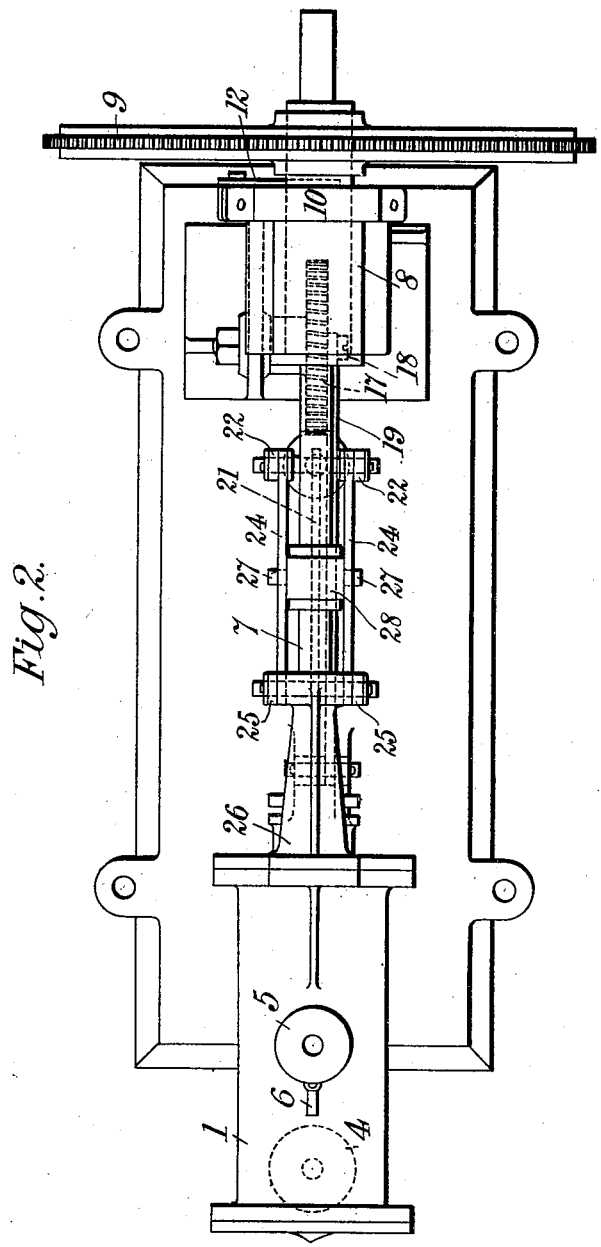

Figure 1 is a side elevation partly in section. Fig. 2 is a plan. Fig. 3 is an end elevation with a pinion removed. Fig. 4 is a plan of a piston used with the apparatus, and Fig. 5 is a plan of a contact part which may replace the piston when the apparatus is altered or arranged for controlling an electric current.

The apparatus in the form shown in Figs. 1 to 4 is adapted to control the flow of a fluid, such as gas or water, and consists of a cylinder 1, mounted on a suitable base and containing a rotatable hollow piston 2, in which is a port or gap 3 of a greater size or width at one end than the other, as shown in Figs. 1 and 4. The cylinder in the case of gas is interposed in the gas-supply—say to the clock-face—by connection with its inlet 4 and outlet 5, so that gas must flow through the port 3 of the piston, or in the case of water is interposed in the water-supply—say to an engine. Where it is desired to keep a gas by-pass alight, a connection may be made between the inlet 4 and outlet 5 or other part by the taps 6 6 and suitable tubing or in other ways. The piston-rod 7 passes through a suitable stuffing-box and a bearing 8, outside of which it carries a gear-wheel 9, which is rotated from a suitable pinion of the clockwork-train or by a chain-gear from the hour-spindle. The wheel 9 is secured to the rod 7 by a suitable feather and groove or in other ways, which will enable the latter to move longitudinally therethrough, but yet to rotate therewith, and a similar device secures to this rod an eccentric 10, the rod 11 of which is pivoted to an arm 12, which has a pawl 13, adapted to act on a ratchet-wheel 14 on a short shaft 15, supported in suitable bearings and carrying a worm 16, engaging a worm-wheel 17 on a stud 18. The wheel 17 has a lever 19 pivoted thereto, the other end of which is pivotally connected to a rocking arm 20, pivoted in turn to the base. To the free end of the arm 20 is also pivoted a lever 21, in turn pivoted between two levers 22 22, rocking on a stud 23 of a bracket, or otherwise movable about a point. The upper ends of the levers 22 are each pivoted, respectively, to one end of a link 24, the other end of which is pivoted to a lever 25, pivotally suspended from a bracket 26, carried by the cylinder 1. The levers 24 24 are centrally pivoted to the trunnions 27 of a block 28, attached to the rod 7. The arrangement of these levers, rocking arms, and links provides a suitable connection between the worm-wheel 17 and the rod 7, whereby the latter may be moved longitudinally to and fro.

In operation the gas or fluid will pass through the piston to the outlet, as stated, the port 3 allowing it to pass until in its rotation, which may occur once in twenty-four hours, the gas or fluid is cut off.

To vary the period for which the gas or fluid is allowed to pass, it will be seen that it is only necessary to bring a different part of the port opposite such opening, because such port varies in width, and to this end the piston is moved longitudinally by the means described, the worm-wheel 17, which forms part of such means, being capable only, say, of an entire rotation once a year, so that for one-half of its travel the piston will pass its entire length over the outlet 5 in one direction and for the other half similarly its entire length in the opposite direction, thus providing for a minimum supply on June 21 to a maximum supply on December 21 back to a minimum on June 21 again.

In Fig. 5 is illustrated a simple construction by which the passage of an electric current can be controlled. In this the piston 3 is replaced by a cylindrical block 29, of insulating material, in which is a metal plate 30, forming part of an electric circuit of a shape corresponding to the gap 3, the edges of the parts being separated by grooves 31. If now in place of the cylinder 1 a brush forming part of a circuit be employed, it will be seen that the circuit will be closed while the brush is in contact with plate 30 and opened at other times, the duration varying according to the width of the plate opposite the brush. The grooves 31 are to afford a quick make-and-break to avoid sparking.

It will be understood that the apparatus may be applied or adapted to other purposes requiring an automatic action annually for timing work according to sunrise and sunset. For instance, it may be used to control the operation of engines or motors which are required to do certain work at certain times, varying with the working hours of a day, such as engines or motors used for pumping water and other purposes, and I include all such purposes in the term "timing" employed in both the specification and claims.

In the following claims where the word "fluid" is employed it is to be understood that electricity is included.

What I claim is—

1. The combination of two conduits for the passage of a fluid, of a rotatable part having a surface of varying width to also form a conduit for said fluid, means for rotating said part to bring said surface into communication with the two conduits, and means for moving said part longitudinally to vary the extent of time of such communication, substantially as set forth.

2. Apparatus for timing and controlling the flow of fluid, comprising a part rotatable to permit or interrupt the passage of the medium employed, for a determined period, said part being also movable longitudinally for the purpose of increasing and decreasing the period of passage of said medium, and means for providing such rotary and longitudinal movements.

3. Apparatus for timing and controlling the flow of fluid, comprising a cylinder having an inlet and outlet, a piston in such cylinder having a port of greater size at one end than the other, means for rotating said piston to open and close an opening in said cylinder for a determined period, and means for moving said piston longitudinally for the purpose of increasing or decreasing said period.

4. Apparatus for timing and controlling the flow of fluid, comprising a cylinder having an inlet and outlet, a piston in such cylinder having a port of greater size at one end than the other, a piston-rod, a gear-wheel on same, means whereby the rod is movable through the wheel, but can rotate therewith, a worm-wheel, means for rotating same, and connections between the worm-wheel and piston-rod whereby the piston is moved longitudinally in its cylinder.

5. Apparatus for timing and controlling the flow of fluid, comprising a cylinder having an inlet and outlet; a piston in such cylinder having a port of greater size at one end than the other, a piston-rod, a gear-wheel on same, means whereby the rod is movable through the wheel but can rotate therewith, a worm-wheel, means for rotating same, such means being driven from the piston-rod, and connections between the worm-wheel and piston-rod whereby the piston is moved longitudinally for the extent of its travel and is then reversed.

In testimony whereof I have hereunto set my hand in the presence of two subscribing witnesses.

HAROLD HUNTER WARD.

Witnesses:
RICHARD JAMES,
GEORGE ISAAC BRIDGES.